US011034129B2

(12) United States Patent
Sargent et al.

(10) Patent No.: US 11,034,129 B2
(45) Date of Patent: Jun. 15, 2021

(54) COMPOSITE AND METHOD FOR MAKING (71) Applicant: SAINT-GOBAIN PERFORMANCE PLASTICS CORPORATION, Solon, OH (US)

(72) Inventors: Joseph G. Sargent, Lowell, MA (US); Gerard T. Buss, Bedford, NH (US); Michael P. Cushman, Williamstown, MA (US); Timothy P. Pollock, Manchester, NH (US); Helen K. Bergstrom, Somerville, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 20 days.

(21) Appl. No.: 15/435,152

(22) Filed: Feb. 16, 2017

(65) Prior Publication Data
US 2017/0232716 A1 Aug. 17, 2017

Related U.S. Application Data (60) Provisional application No. 62/295,558, filed on Feb. 16, 2016.

(51) Int. Cl.
*B32B 17/04* (2006.01)
*B32B 5/02* (2006.01)
(Continued)

(52) U.S. Cl.
CPC ............. *B32B 5/024* (2013.01); *B32B 5/022* (2013.01); *B32B 7/02* (2013.01); *B32B 17/04* (2013.01);
(Continued)

(58) Field of Classification Search
CPC .......... B32B 5/022; B32B 5/024; B32B 17/04
See application file for complete search history.

(56) References Cited

U.S. PATENT DOCUMENTS 3,790,403 A * 2/1974 Ribbans, III ......... D06N 3/0093
442/180
4,372,800 A * 2/1983 Oizumi ................... B29C 70/50
156/307.3
(Continued)

FOREIGN PATENT DOCUMENTS

EP    0159942 A2   10/1985
EP    2749407 A1    7/2014
(Continued)

OTHER PUBLICATIONS

International Search Report for PCT/US2017/018221 dated Jun. 1, 2017, 1 page.

*Primary Examiner* — Z. Jim Yang
(74) *Attorney, Agent, or Firm* — Abel Schillinger, LLP; Chi Suk Kim (57) ABSTRACT

A composite includes a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that is defect free; wherein the composite has a continuous length of at least about 3 meters. Embodiments of such composites can find applications, for example, as processing aids for an electronic device, a food, a polymer, insulating an electrical device, or heat sealing a polymer.

18 Claims, 4 Drawing Sheets

(51) Int. Cl.
- *B32B 27/08* (2006.01)
- *B32B 27/20* (2006.01)
- *B32B 27/30* (2006.01)
- *B32B 27/28* (2006.01)
- *B32B 27/32* (2006.01)
- *B32B 7/02* (2019.01)
- *B32B 27/12* (2006.01)
- *B32B 37/06* (2006.01)

(52) U.S. Cl.
CPC .............. *B32B 27/08* (2013.01); *B32B 27/12* (2013.01); *B32B 27/205* (2013.01); *B32B 27/285* (2013.01); *B32B 27/304* (2013.01); *B32B 27/322* (2013.01); *B32B 37/06* (2013.01); *B32B 2250/03* (2013.01); *B32B 2250/04* (2013.01); *B32B 2250/05* (2013.01); *B32B 2250/40* (2013.01); *B32B 2260/021* (2013.01); *B32B 2260/046* (2013.01); *B32B 2262/0238* (2013.01); *B32B 2262/0253* (2013.01); *B32B 2262/0269* (2013.01); *B32B 2262/101* (2013.01); *B32B 2262/106* (2013.01); *B32B 2262/14* (2013.01); *B32B 2270/00* (2013.01); *B32B 2307/204* (2013.01); *B32B 2307/538* (2013.01); *B32B 2307/554* (2013.01); *B32B 2307/7246* (2013.01); *B32B 2307/732* (2013.01); *B32B 2309/105* (2013.01); *B32B 2433/02* (2013.01); *B32B 2433/04* (2013.01); *B32B 2457/00* (2013.01); *B32B 2457/04* (2013.01)

(56) References Cited

U.S. PATENT DOCUMENTS

| | | | | |
|---|---|---|---|---|
| 4,865,903 A | | 9/1989 | Adiletta | |
| 4,886,699 A | * | 12/1989 | Carroll | B32B 5/26 442/235 |
| 5,230,937 A | | 7/1993 | Effenberger et al. | |
| 5,357,726 A | * | 10/1994 | Effenberger | B29C 66/71 156/161 |
| 5,368,924 A | * | 11/1994 | Merrill, Jr. | D06N 3/0063 343/872 |
| 5,941,172 A | * | 8/1999 | Brookfield | B32B 27/12 101/379 |
| 6,342,280 B1 | * | 1/2002 | Patrick | B32B 27/00 427/176 |
| 8,490,343 B2 | | 7/2013 | Sahlin et al. | |
| 8,572,907 B2 | | 11/2013 | Sahlin et al. | |
| 8,975,197 B2 | | 3/2015 | Thornton et al. | |
| 2002/0123282 A1 | * | 9/2002 | McCarthy | C08L 27/12 442/180 |
| 2004/0229043 A1 | | 11/2004 | Spohn et al. | |
| 2005/0245150 A1 | * | 11/2005 | Rector | B29C 70/22 442/59 |
| 2006/0035089 A1 | * | 2/2006 | Ishiwari | B32B 27/00 428/422 |
| 2006/0046063 A1 | * | 3/2006 | Tippett | B32B 27/12 428/411.1 |
| 2007/0049146 A1 | * | 3/2007 | Lee | B32B 27/04 442/180 |
| 2008/0032576 A1 | * | 2/2008 | Kelmartin | B32B 27/12 442/88 |
| 2009/0197091 A1 | * | 8/2009 | Kirk, II | B32B 25/12 428/422 |
| 2010/0044382 A1 | * | 2/2010 | Woerner | D06N 3/047 220/573.2 |
| 2010/0065315 A1 | * | 3/2010 | Kimura | B32B 27/28 174/258 |
| 2010/0151239 A1 | | 6/2010 | Herbert et al. | |
| 2010/0159223 A1 | * | 6/2010 | Keese | B32B 5/022 428/219 |
| 2010/0266852 A1 | * | 10/2010 | Fan | B32B 5/024 428/422 |
| 2010/0323277 A1 | | 12/2010 | Roberts | |
| 2011/0247686 A1 | * | 10/2011 | Honeker | B32B 9/045 136/256 |
| 2011/0303101 A1 | * | 12/2011 | Fan | A47J 37/045 99/443 C |
| 2012/0058326 A1 | * | 3/2012 | Tippett | B65G 15/38 428/220 |
| 2012/0108133 A1 | * | 5/2012 | Nitta | B65G 15/38 442/208 |
| 2012/0148849 A1 | | 6/2012 | Fan et al. | |
| 2013/0199607 A1 | | 8/2013 | Garreau-Iles | |
| 2013/0231020 A1 | * | 9/2013 | Liao | D06N 3/047 442/59 |
| 2013/0280531 A1 | | 10/2013 | Thornton et al. | |
| 2013/0281579 A1 | | 10/2013 | Nelson et al. | |
| 2013/0337250 A1 | * | 12/2013 | Austin | B32B 27/306 428/219 |
| 2014/0194023 A1 | * | 7/2014 | Schwiegel | B32B 27/12 442/189 |
| 2014/0335750 A1 | * | 11/2014 | Adams | B32B 27/36 442/57 |
| 2015/0093066 A1 | * | 4/2015 | Speicher | B32B 37/10 384/625 |
| 2015/0140473 A1 | * | 5/2015 | Abusleme | C08J 5/18 429/516 |
| 2015/0296614 A1 | | 10/2015 | Williams et al. | |
| 2015/0307670 A1 | * | 10/2015 | McNamara | C08J 5/04 428/141 |

FOREIGN PATENT DOCUMENTS

| | | | |
|---|---|---|---|
| JP | 6135245 A2 | | 2/1986 |
| JP | 0698736 B2 | | 12/1994 |
| JP | 2003526593 A | | 9/2003 |
| JP | 2004238447 A | * | 8/2004 |
| JP | 2004243631 A | | 9/2004 |
| JP | 2010517747 A2 | | 5/2010 |
| JP | 2012148488 A | | 8/2012 |
| JP | 2015157474 A | | 9/2015 |
| WO | 0168752 A1 | | 9/2001 |
| WO | 2008094652 A2 | | 8/2008 |

* cited by examiner

COMPOSITE AND METHOD FOR MAKING

CROSS-REFERENCE TO RELATED APPLICATION(S)

This application claims priority under 35 U.S.C. § 119(e) to U.S. patent application Ser. No. 62/295,558, entitled "COMPOSITE AND METHOD FOR MAKING," by Gerald T. Buss et al., filed Feb. 16, 2016, which is assigned to the current assignee hereof and incorporated herein by reference in its entirety.

FIELD OF THE DISCLOSURE

The disclosure relates to composites comprising a reinforcing fabric and a fluoropolymer film, coating, or combination thereof.

BACKGROUND

Composite structures have a multitude of applications, particularly for processing aids for a variety of applications, or as a final product, such as a radome or expansion joint. The composite structure must withstand external forces for long periods of time. For instance, many composite structures are in contact with harsh chemicals and/or processing environments. As such, resistant layers, such as those made of a fluoropolymer, are widely used in industry. Fluoropolymers have a number of desirable properties such as chemical resistance, heat resistance, durable release, electrically insulative, durable hydrophobicity, and low coefficient of friction, and the like to protect composite reinforcements from harsh environments. For instance, the fluoropolymer layer, when used in a composite reinforcing structure, may aid in maintaining the integrity and performance of the composite when used as a processing aid or final product in a harsh environment. Tailoring the composite structure in accordance with the properties desired can be a challenge.

Hence, it would be desirable to provide an improved composite structure that can combine the physical demands as a processing aid or final product with desirable properties for the exposed layers.

SUMMARY

In a first aspect, a composite includes a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch; wherein the composite has a continuous length of at least about 3 meters.

In a second aspect, a method of manufacturing a composite includes providing a first layer of a first fluoropolymer; overlying a second layer of at least one ply of a reinforcing fabric onto the first layer; overlying a third layer of a second fluoropolymer onto the second layer opposite to the first layer to form a stack; and continuously compressing and heating the stack through two substantially parallel surfaces to form the composite at a continuous length of at least 3 meters, the first layer, the third layer, or combination thereof having an outer surface that has less than 50 surface cracks per 0.5 square inch.

In a third aspect, an apparatus to manufacture an electronic device includes a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 3 surface protrusions of 0.1 mm in height dimension per 100 square meters and less than 50 surface cracks per 0.5 square inch; wherein the composite has a continuous length of at least about 3 meters.

In a fourth aspect, an apparatus to process food includes a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch and a water vapor transmission rate of less than about 0.05 oz/m$^2$-day for the composite having a total thickness of 10 mil.

In a fifth aspect, an apparatus to process polymers includes a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch and a water vapor transmission rate of less than about 0.05 oz/m$^2$-day for the composite having a total thickness of 10 mil.

In a sixth aspect, an apparatus to insulate an electrical device includes a composite, the composite including a first layer of a first fluoropolymer; a second layer of at least one ply of a reinforcing fabric overlying the first layer; and a third layer of a second fluoropolymer overlying the second layer opposite to the first layer; wherein the composite has a dielectric strength of at least 1000 volts/mil for the composite having a total thickness of 10 mil.

In a seventh aspect, an apparatus to process a heat sealable polymer includes a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch and wherein the composite has a surface smoothness Ra value of less than 20 microinches.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . " These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C.

In an embodiment, a composite includes a first layer of a first fluoropolymer. The composite can further include a second layer of at least one ply of a reinforcing fabric overlying the first layer. The composite can further include a third layer of a second fluoropolymer overlying the second layer opposite to the first layer. The first layer, the third layer, or combination thereof have a desirable outer surface that is substantially free of a defect. "A defect" as used herein refers to a surface crack, a void, a protrusion, or combination thereof. In an embodiment, an outer surface of the first layer, third layer, or combination thereof that has less than 50 surface cracks per 0.5 square inch as measured by a Cognex 5605 vision system. In a further embodiment, the outer surface of the first layer, the third layer, or combination thereof has a maximum of 3 surface protrusions of 0.1 mm in height dimension per 100 square meters as measured by a Cognex 5605 vision system. Further, the composite has an advantageous length, such as at least about 2 meters, at least about 3 meters, at least about 4 meters, at least about 5 meters, or even greater.

Figure 1:
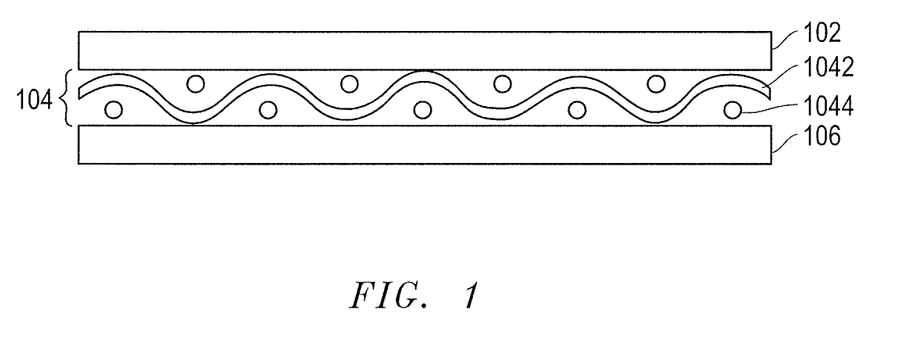
FIGS. 1, 2A, and 2B show exemplary embodiments of a composite in schematic sectional view.

Referring to FIG. 1, the composite includes a first layer 102 of a first fluoropolymer. Any reasonable fluoropolymer is envisioned. In an embodiment, the first fluoropolymer can be any fluoropolymer. In a particular embodiment, the first fluoropolymer can be any non-melt processable fluoropolymer. "Non-melt processible" as used herein refers to a fluoropolymer and is any fluoroplymer that does not soften enough when brought to its melt point such that it will flow. In one embodiment, the non-melt processable fluoropolymer includes polytetrafluoroethylene (PTFE), modified polytetrafluoroethylene (mPTFE), or a combination thereof. In one embodiment, the first fluoropolymer consists essentially of PTFE, mPTFE, or a combination thereof. In a more particular embodiment, the first fluoropolymer consists of PTFE, mPTFE, or combination thereof.

In an alternative embodiment, the first fluoropolymer further includes a melt processable fluoropolymer. Any melt processible fluoropolymer is envisioned and includes, for example, tetrafluoroethylene-hexafluoropropylene (FEP), perfluoroalkoxyethylene (PFA), ethylene-tetrafluoroethylene (ETFE), polyvinylidene fluoride (PVDF), ethylene-chlorotrifluoroethylene (ECTFE), perfluoro methyl vinyl ether (MFA), a blend, a copolymer, or any combination thereof. In a particular embodiment, the melt processable fluorpolymer is present at an amount of not greater than about 10 weight %, based on the total weight of the fluoropolymer.

Any method of providing the first fluoropolymer includes, for example, casting, skiving, or extruding. In an alternative embodiment, the first fluoropolymer is provided as a dry powder coating. In an embodiment, the first fluoropolymer may be provided in part as a dry powder coating, for instance, part of the dry powder coating may be a dispersion coating with the balance being a powder coating. Any reasonable thickness is envisioned for first layer 102. In one particular embodiment, the thickness of layer 102 ranges from about 0.05 mm to about 2.0 mm, such as about 0.1 mm to about 2.0 mm, or even about 0.2 mm to about 2.0 mm. It will be appreciated that the thickness of the first layer 102 can be within a range between any of the minimum and maximum values noted above.

The composite further includes a second layer 104 including at least one ply of a reinforcing fabric. In an embodiment, the second layer 104 is directly in contact with the first layer 102. The reinforcing fabric can include reasonable material. For instance, the reinforcing fabric includes at least one yarn of a fluoropolymer fiber, an aramid fiber, a glass fiber, or combination thereof. In an embodiment, the at least one yarn is a glass fiber. In one embodiment, fluoropolymer fiber of the reinforcing fabric can include polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoro-ethylene-perfluoro (methyl vinyl ether) (MFA), polyvinylidene fluoride (PVDF), ethylene-chlorotrifluoroethylene (ECTFE), or any combination thereof. In one embodiment, the reinforcing fabric includes polytetrafluoroethylene (PTFE), modified polytetrafluoroethylene (mPTFE), or combination thereof.

In an embodiment, the ply of reinforcing fabric 104 can have any reasonable thickness. In a particular embodiment, the ply of reinforcing fabric 104 can have a thickness of at least about 0.04 mm, such as of at least about 0.08 mm, at least about 0.12 mm, at least about 0.16 mm, at least about 0.20 mm, at least about 0.24 mm, at least about 0.28 mm, at least about 0.32 mm, or at least about 0.36 mm. In another embodiment, the ply of reinforcing fabric 104 can have a thickness of not greater than about 1 mm, such as not greater than about 0.8 mm, not greater than about 0.6 mm, not greater than about 0.5 mm, not greater than about 0.45 mm, not greater than about 0.4 mm, not greater than about 0.3 mm, not greater than about 0.26 mm, or not greater than about 0.22 mm. In a particular embodiment, the thickness can be in a range from about 0.04 mm to about 1.0 mm, such as about 0.08 mm to about 1.0 mm, or even about 0.20 mm to about 0.8 mm. It will be appreciated that the thickness of the ply of reinforcing fabric 104 can be within a range between any of the minimum and maximum values noted above.

In an exemplary embodiment, the ply of reinforcing fabric 104 includes an assembly of yarns, for example, warp yarns 1042 and weft yarns 1044. Any configuration of the warp yarns 1042 and the weft yarns 1044 are envisioned. In an embodiment, the warp yarns 1042 and the weft yarns 1044 may be woven or non-woven. In embodiments, the warp and the weft can be in any angled orientation, such as an orthogonal orientation, i.e., the angle between all the warp direction and the weft direction is about 90°. In another embodiment, the angle between the warp direction and the weft direction can be non-orthogonal, i.e. the angle is between 0° and 90°. For example, in one embodiment, a skewed angle between the warp direction and weft direction can be about 45°. It is also contemplated that the composite includes any number of plies of reinforcing fabric overlying each other. For instance, it is also contemplated that in cases of any number of plies, the assembly can include orthogonal warp/weft fabrics and non-orthogonal warp/weft fabrics.

In an embodiment, the warp yarn 1042 or weft yarn 1044 have any thickness envisioned. For instance, the warp yarn 1042 or weft yarn 1044 can have the same thickness or different thickness. In embodiments, either thickness can be at least about 0.02 mm, such as at least about 0.04 mm, at least about 0.06 mm, at least about 0.08 mm, or at least about 0.1 mm. In another embodiment, the yarn thickness can be not greater than about 0.3 mm, such as not greater than about 0.28 mm, not greater than about 0.26 mm, not greater than about 0.24 mm, not greater than about 0.22 mm, or not greater than about 0.2 mm. In one particular embodiment, the yarn thickness can range from about 0.16 mm to about 0.18 mm. It will be appreciated that the yarn thickness can be within a range between any of the minimum and maximum values noted above.

Any reasonable weight is envisioned for the ply. Each ply according to an embodiment can have a weight of at least about 100 g/m$^2$, such as at least about 120 g/m$^2$, at least about 160 g/m$^2$, at least about 200 g/m$^2$, at least about 240 g/m$^2$, or at least about 300 g/m$^2$. In another embodiment, the ply can have a weight of not greater than about 500 g/m$^2$, not greater than about 480 g/m$^2$, not greater than about 460 g/m$^2$, not greater than about 440 g/m$^2$, not greater than about 420 g/m$^2$, or not greater than about 400 g/m$^2$. In one particular embodiment, the weight can range from about 100 g/m$^2$ to about 500 g/m$^2$, such as about 120 g/m$^2$ to about 480 g/m$^2$, or even about 200 g/m$^2$ to about 400 g/m$^2$. It will be appreciated that the weight of the ply can be within a range between any of the minimum and maximum values noted above.

Addressing the thread counts of the reinforcing fabric, the ply has a warp thread count and a weft thread count. Any reasonable warp thread count and weft thread count may be envisioned. The warp thread count and the weft thread count can be the same or different. Either thread count can be at least about 100 threads/10 cm, at least about 150 threads/10 cm, at least about 200 threads/10 cm, at least about 250 threads/10 cm, at least about 300 threads/10 cm, or at least about 350 threads/10 cm. In another embodiment, either thread count, warp or weft thread count, is not greater than about 600 threads/10 cm, not greater than about 550 threads/10 cm, not greater than about 500 threads/10 cm, not greater than about 450 threads/10 cm, or not greater than about 400 threads/10 cm. In one particular embodiment, the thread count for both yarns are the same and range from about 325 threads/10 cm to 425 threads/10 cm. It will be appreciated that the thread count can be within a range between any of the minimum and maximum values noted above.

Still referring to FIG. 1, the composite can include a third layer 106 overlying the ply of the reinforcing fabric 104 and opposite to first layer 102. In an embodiment, the third layer 106 is directly in contact with the second layer 104. In an embodiment, the third layer 106 is a second fluoropolymer. In an embodiment, the second polymer can be any fluoropolymer described for the first fluoropolymer. In one embodiment, the third layer 106 can be of the same material and thickness as first layer 102. In another embodiment, the third layer 106 can differ from the first layer 102 in type of fluoropolymer, in mode of applying the layer, in thickness, or combination thereof.

Still referring to FIG. 1, in an embodiment, the first layer 102, the third layer 106, or combination thereof can further include at least one filler. In other embodiments, the layers 102 and 106 can include the same or different filler. Any reasonable filler is envisioned. The filler can be selected from a fiber, a glass fiber, a carbon fiber, an aramid, an inorganic material, a ceramic material, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulfone (PES), polyphenylene sulfone (PPSO$_2$), liquid crystal polymer (LCP), polyetherketone (PEK), polyether ether ketone (PEEK), aromatic polyester (Ekonol), mineral material, wollastonite, barium sulfate, or any combinations thereof. In an embodiment, the filler can be present in any reasonable amount, such as an amount of about 1% by volume to about 40% by volume, such as about 2% by volume to about 35% by volume, such as about 3% by volume to about 30% by volume. It will be appreciated that the amount of filler can be within a range between any of the minimum and maximum values noted above. In an alternative embodiment, the first layer 102, the third layer 106, or combination thereof is substantially free of a filler with less than 1% by volume.

Figure 2A:
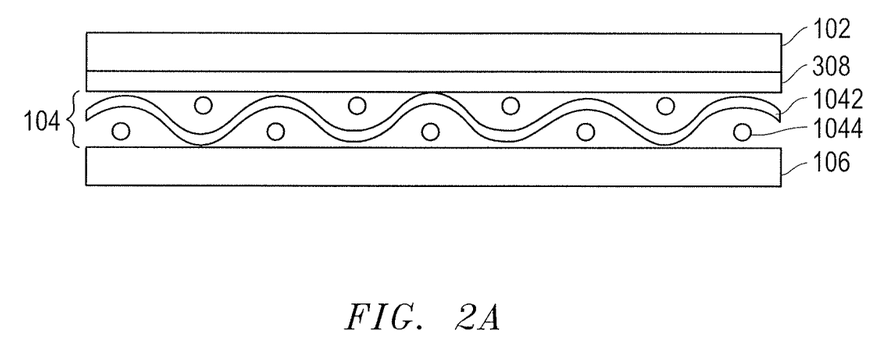
Figure 2B:
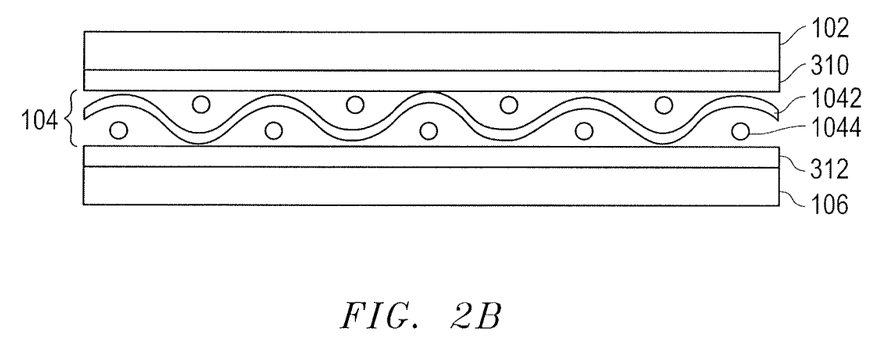

Referring to FIGS. 2A and 2B, in another embodiment, there can be at least one mid layer. In an embodiment, there can be a mid layer 308 between layer 102 and the ply of the reinforcing layer 104 made of yarns 1042 and 1044. As illustrated, the mid layer 308 may be directly in contact with layer 102 and the ply of the reinforcing layer 104. In another embodiment as displayed in FIG. 2B, there can be one mid layer 310 between layer 102 and the ply of the reinforcing layer 104 made of yarns 1042 and 1044, and also a mid layer 312 between the ply of the reinforcing layer 104 and layer 106. As illustrated, the mid layer 310 may be directly in contact with layer 102 and the ply of the reinforcing layer 104. Further, mid layer 312 may be directly in contact with layer 106 and the ply of the reinforcing layer 104.

The mid layer 308, 310, and 312 can include any reasonable material. In a particular embodiment, the mid layer 308, 310, and 312 is any reasonable fluoropolymer such as, for example, tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), a copolymer, a blend, or combination thereof. In an embodiment, the mid layer may include a non-melt processible fluoropolymer. The mid layer can include a blend of fluoropolymer and a silicone elastomer. In more particular embodiments, the mid layer includes a fluoropolymer-silicone elastomer blend. In certain embodiments, the fluoropolymer-silicone elastomer blend can provide an improved flexibility to the coated fabric. Further, the coated fabric can be coated with a silicone oil. In particular embodiments, the silicone oil can be applied on its own or blended with a fluoropolymer. In certain embodiments, the silicone oil, alone or in a fluoropolymer blend, can improve the flexibility, weatherability, or both, of the coated fabric. In embodiments, layer 310 and 312 can be the same material or different material. Any thickness of the mid layer may be envisioned.

In an embodiment, at least a portion of the reinforcing fabric can be at least partially embedded to any suitable depth from a surface or edge of the mid layer. For example, at least a portion of the reinforcing fabric can be embedded to between about 0.3 mils and about 10.0 mils from a surface or edge of the mid layer. For example, the reinforcing fabric can be partially or substantially embedded in a mid layer to provide a composite with the reinforcing fabric partially or substantially embedded to a suitable depth from a surface or edge of the mid layer. In an embodiment, the mid layer substantially impregnates a plurality of interstices between an assembly of yarns of the reinforcing fabric.

Referring to FIGS. 1, 2A, and 2B, the composite can have a total thickness of at least about 0.3 mm, such as at least about 0.4 mm, at least about 0.5 mm, at least about 0.6 mm, at least about 0.7 mm, at least about 0.8 mm, at least about 0.85 mm, at least about 0.9 mm, or at least about 0.95 mm. In another embodiment, the total thickness is not greater than about 2.0 mm, such as not greater than about 1.8 mm, not greater than about 1.6 mm, not greater than about 1.5 mm, not greater than about 1.4 mm, not greater than about 1.3 mm, not greater than about 1.2 mm, not greater than about 1.15 mm, or not greater than about 1.1 mm. In one particular embodiment, the total thickness can range from about 0.85 mm to about 1.15 mm. It will be appreciated that the total thickness of the composite can be within a range between any of the minimum and maximum values noted above.

Although illustrated in FIG. 1 as three layers, any number of layers is envisioned. For instance, the composite includes at least three layers, at least four layers, or even a greater number of layers. The number of layers is dependent upon the final properties desired for the composite. In an embodiment, any number of layers as described as the first layer, the second layer, the third layer, and the mid layer is envisioned. The composite may further include other layers. Other layers include, for example, a polymeric layer, a reinforcing fabric, an adhesive layer, a barrier layer, a chemically resistant layer, a metal layer, any combination thereof, and the like. Any reasonable method of providing any additional layer is envisioned and is dependent upon the material chosen. For instance, the additional layer may be an additional polymeric layer of a fluoropolymer material, such as a melt processible fluoropolymer, a non-melt processible fluoropolymer, or a combination thereof. Any thickness of the other layers may be envisioned.

Referring to FIGS. 1, 2A, and 2B, the composite can be prepared by any reasonable method. For instance, the composite can be prepared using any reasonable time, temperature, and pressured controlled lamination process, wherein layer 102, the ply of the reinforcing fabric 104, and layer 106 are assembled, optionally including a material to form mid layer 308, 310, and 312. Any method of providing the layer 102 and 106 is envisioned depending upon the material chosen, such as casting, skiving, or extruding. In an embodiment, the layer 102 and 106 is dry powder coated. In an example, the layer 102 and 106 are sintered or non-sintered. In an example, the optional mid layer 308, 310, and 312 are formed by any method envisioned. For instance, mid layer 308, 310, and 312 may be formed with a precursor, such precursor can be dry powdered forms of the mid layer material. Mid layer 308, 310, and 312 may also be cast, skived, or extruded. In an example, mid layer 308, 310, and 312 is sintered or non-sintered. In an embodiment, midlayer 308, 310, and 312 may replace layer 102 and/or 106, with the proviso that the composite includes at least one outer surface layer that includes a non-melt processible fluoropolymer.

According to one embodiment, the process for manufacturing the composite includes providing a first layer of a first fluoropolymer, which will result in layer 102. Then, at least one ply of a reinforcing fabric 104 including yarns 1042 and 1044 is applied onto the first layer 102. Afterwards, a layer of a second fluoropolymer, which will become layer 106 upon completion of the process, is applied. Accordingly, the assembly of first fluoroploymer 102, ply 104, and second fluoropolymer 106 form a pre-lamination stack. The pre-lamination stack may or may not include mid layer 308, 310, and 312. Prior to the assembly of any of the layers, a surface treatment may be applied to increase the adhesive strength between the layers. For instance, the ply of reinforcing fabric 104 may be surface treated by any reasonable method prior to overlying the third layer 106.

In the time-pressure-temperature controlled lamination process, any reasonable conditions are envisioned. In an exemplary embodiment, the pre-lamination stack is continuously compressed between two substantially parallel surfaces. Any reasonable pressure is envisioned. In an embodiment, the pressure of compression is at least about 0.5 MPa, such as at least about 1 MPa, such as at least about 2 MPa, such as at least about 3 MPa, or at least about 4 MPa. In another process example, the pressure is not greater than about 8 MPa, such as not greater than about 6 MPa, or not greater than about 4 MPa. In an embodiment, the pressure of compression is about 0.5 MPa to about 8.0 MPa. It will be appreciated that the pressure can be within a range between any of the minimum and maximum values noted above.

At the same time, the compressed pre-lamination stack is continuously heated. For example, the compressed pre-lamination stack can be heated to at least about 200° C., such as at least about 250° C., such as at least about 300° C., such as at least about 340° C., such as at least about 360° C., at least about 380° C., or at least about 400° C. In an embodiment, the temperature is in a range of about 200° C. to about 400° C. In another process example, the compressed pre-lamination stack can be heated to not more than about 340° C., such as not more than about 320° C., or not more than about 300° C. It will be appreciated that the temperature can be within a range between any of the minimum and maximum values noted above.

Referring further to the lamination process, the pre-lamination stack can be continuously compressed and heated as described above for a duration of at least 10 seconds, such as at least about 20 seconds, such as at least about 30 seconds, such as at least about 45 seconds, or at least 60 seconds.

In another process example, after the heating, the stack can be cooled to a second temperature. For example the stack can be cooled to not greater than about 300° C., such as not greater than about 200° C., not greater than about 150° C., or not greater than about 50° C. The cooling can occur at a cooling rate of at least 5° C./s and not greater than 20° C./s. In an embodiment, the stack can be cooled under pressure, for example, under continuous pressure of compression as described above. In an alternative embodiment, the stack can be cooled without pressure.

In a particular embodiment, the process for manufacturing the composite allows for a continuous process at extended lengths. Extended lengths of composite are at least about 2 meters, at least about 3 meters, at least about 4 meters, at least about 5 meters, or even greater. In addition to continuous lengths, the composite has a number of desirable properties. The composite can be tailored to provide for any desirable property depending on the end-use application. For instance, a composite may have any combination of desirable properties such as a defect free surface, adhesive strength between the layers, cohesive strength between the layers, vapor permeability, flex life, abrasion resistance, and surface smoothness.

In an embodiment, the composite may have adhesive strength between the layers. For instance, the composite may have increased inter-layer adhesion. "Inter-layer" is defined as a surface interface between a reinforcing fabric and a mid layer. In another embodiment, the composite may have cohesive strength between the layers. "Cohesive strength" as used herein indicates that the material of each respective layer ruptures before the bond between the first layer, the second layer, and third layer fails. In a particular embodiment, the inter-layer adhesion and cohesive strength reduces blistering and delamination in the composite and further provides a desirable belt seam strength. "Belt seam" is the interface where two ends of a composite are fixed together, i.e. seamed.

In an embodiment, the composite has a desirable water vapor permeability. In a particular embodiment, the composite has a water vapor permeability of not greater than 0.05 oz/m$^2$-day.

Some processing aids, such as release belts and sheets, and final products have at least one side of the composite exposed to high wear and tear. Accordingly, a composite with a long lifetime is desired. A high frequency flexlife test allows in a lab setting a determination for lifetime and onset of wear or fatigue of the composite. In an embodiment, the flex life of the composite may be at least 100 cycles, such as at least 1000 cycles, such as at least 5000 cycles as determined through MIT flex testing. In an example the composite has an initial wear resistance quantified as a less than 10% change in coefficient of friction after being subject to 200 revolutions in a pin-on disk wear test as measured by, for example, ASTM G99-17 "Standard Test Method for Wear Testing with a Pin-on-Disk Apparatus.

In a further example, the composite has an abrasion resistance of less than 1% mass loss after 100 cycles or less than 1% exposure of fabric knuckles, as measured by, for example, Taber Abrasion ASTM D3389 Standard Test Method for Coated Fabrics Abrasion Resistance (Rotary Platform Abrader).

The composite may have increased consolidation of the first layer, the third layer, or combination thereof, the increased consolidation resulting in reduced voids and cracks in the fluoropolymer, further resulting in a reduced penetration, i.e. wicking, of oils as well as a harder more wear resistant surface. In a further embodiment, increased consolidation results in a desirable dielectric strength for a given composite thickness. In an embodiment, the improvement in the dielectric strength of the composite is greater than at least about 10%, such as at least about 20%, or even greater than 30% compared to a conventionally available product. For instance, a composite having a thickness of 10 mil has a dielectric strength of greater than 1000 volts/mil, such as greater than 1200 volts/mil.

Further, the outer surface of the first layer, the third layer, or combination thereof may have a smooth surface that is easier to clean and provide an extended release life, for instance, with a crack free surface and a mark-off free surface. In an embodiment, surface smoothness may also be achieved, such as a Ra of 20 microinches or less.

In a particular embodiment, the composite can be designed for a particular end-use application. For instance, the composite may be used in any reasonable apparatus envisioned, such a processing aid for an electronic device, a food, a polymer, an industrial device, or a structural article. Any processing aid is envisioned and may be, for example, a release sheet, a belt, a tape, or a sheet.

In an embodiment, the composite may be used as a processing aid for the manufacture of an electronics device, such as a printed circuit board. An exemplary processing aid includes a release sheet or a belt. Properties achieved for the composite used as a processing aid for the manufacture of an electronics device include a continuous length with a smooth, protrusion free surface providing a mark-off free surface as well as a crack free surface that is easier to clean and has an extended release life. In a particular embodiment, the composite used as an exemplary processing aid for an electronic device has a maximum of 3 surface protrusions of 0.1 mm in height dimension per 100 square meters as measured by a Cognex 5605 vision system. Further, the composite used as an exemplary processing aid for an electronic device has a maximum of 50 surface cracks per 0.5 square inch as measured by a Cognex 5605 vision system.

In another embodiment, the composite may be used as a processing aid for food processing. An exemplary processing aid includes a release sheet or a belt. Properties achieved with the composite used as a processing aid for food include increased inter-layer adhesion and cohesive strength between the first layer, the second layer, and the third layer that reduces blistering and delamination in the composite with a desirable belt seam strength. The composite further has increased consolidation of the first layer, the third layer, or combination thereof, the increased consolidation resulting in reduced voids and cracks in the polymer, resulting in a reduced penetration, i.e. wicking, of oils as well as a harder more wear resistant surface. Further, the first layer, the third layer, or combination thereof of the composite has a smooth surface that is easier to clean and has an extended release life, for instance, with a crack free surface. In an embodiment, the composite used as an exemplary processing aid for a food has a maximum of 50 surface cracks per 0.5 square inch as measured by a Cognex 5605 vision system. In a further embodiment, the composite used as an exemplary processing aid for food had a water vapor transmission of less than 0.05 oz/m$^2$-day. In yet another embodiment, the composite used as a food processing aid has a flex life of at least 100 cycles, such as at least 1000 cycles, such as at least 5000 cycles [MIT Flex Test], abrasion resistance of less than 1% mass loss after 100 cycles or less than 1% exposure of fabric knuckles [Taber Abrasion ASTM D3389 Standard Test Method for Coated Fabrics Abrasion Resistance (Rotary Platform Abrader)] and a surface smoothness (Ra) of 20 microinches or less. In an embodiment, the composite has a continuous length of at least about 3 meters.

In yet another embodiment, the composite may be used as a processing aid for polymer processing. An exemplary processing aid includes a release sheet or a belt. Properties achieved with the composite used as a processing aid for a polymer include increased consolidation resulting in reduced voids and cracks in the polymer, resulting in a reduced penetration, i.e. wicking, of oils as well as a harder more wear resistant surface. Further, the composite has a smooth surface that is easier to clean and has an extended release life, for instance, with a crack free surface. In an embodiment, the composite used as an exemplary processing aid for a food has a maximum of 50 surface cracks per 0.5 square inch as measured by a Cognex 5605 vision system. In a further embodiment, the composite used as an exemplary processing aid for food has a water vapor transmission of less than 0.05 oz/m$^2$-day. In yet another embodiment, the composite used as an exemplary food processing aid has a flex life of at least 5000 [MIT flex test] and a surface smoothness (Ra) of 20 microinches or less. In an embodiment, the composite has a continuous length of at least about 3 meters.

In yet another embodiment, the composite may be used as insulation for an electrical device. An exemplary form of the insulation includes a tape or a sheet. Properties achieved with the composite used as insulation include increased consolidation resulting in reduced voids and cracks in the polymer, resulting in a desirable dielectric strength for a given composite thickness. For instance, the composite has a dielectric strength of at least about 1000 volts/mil for a composite having a thickness of 10 mil.

In yet another embodiment, the composite may be used as a processing aid for heat sealing a polymer. An exemplary processing aid for sealing a melt-processable polymer includes a tape, a sheet, or a belt. Further, the composite has increased consolidation resulting in reduced voids and cracks in the polymer, resulting in a harder more wear resistant surface. Further, the composite has a smooth surface that is easier to clean and has an extended release life. Additionally, the surface of at least the first layer, the third layer, or combination thereof is crack free providing an extended release life. In an embodiment, the composite used as an exemplary processing aid for heat sealing a polymer has a maximum of 50 surface cracks per 0.5 square inch as measured by Cognex 5605 vision system. In a further embodiment, the composite used as an exemplary processing aid for heat sealing has a surface smoothness (Ra) of 20 microinches or less. In an embodiment, the composite has a continuous length of at least about 3 meters.

Although a few applications are described above, the composite may be used in any application where the aforementioned benefits are desired. In an example, the composite may be a final product. In a particular example, the composite is a radome or expansion joint.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that is substantially defect free.

Embodiment 2

A method of manufacturing a composite, the method including providing a first layer of a first fluoropolymer; overlying a second layer of at least one ply of a reinforcing fabric onto the first layer; overlying a third layer of a second fluoropolymer onto the second layer opposite to the first layer to form a stack; and continuously compressing at a pressure of about 0.5 MPa to about 8 MPa and heating the stack at a temperature of about 200° C. to about 400° C. through two substantially parallel surfaces to form the composite at a continuous length of at least 3 meters.

Embodiment 3

The composite or method of manufacturing the composite according to embodiments 1 or 2, wherein the composite has a cohesive strength between the first layer, the second layer, and the third layer.

Embodiment 4

The composite or method of manufacturing the composite according to embodiments 1 or 2, wherein the composite has an adhesive strength between the first layer, the second layer, the third layer, or combination thereof.

Embodiment 5

The composite or method of manufacturing the composite according to embodiments 1 or 2, wherein the composite has an initial wear resistance quantified as a less than 10% change in coefficient of friction after being subject to 200 revolutions in a pin-on disk wear test.

Embodiment 6

The composite or method of manufacturing the composite according to embodiments 1 or 2, wherein the composite has an abrasion resistance of less than 1% mass loss after 100 cycles or less than 1% exposure of fabric knuckles.

Embodiment 7

The composite or method of manufacturing the composite according to embodiments 1 or 2, wherein the composite has a water vapor transmission rate of less than about 0.05 oz/m$^2$-day for the composite having a total thickness of 10 mil.

Embodiment 8

The composite or method of manufacturing the composite according to embodiments 1 or 2, wherein the first layer and the third layer are substantially free of cracking and voids through a thickness of the first layer and the third layer.

Embodiment 9

The composite or method of manufacturing the composite according to embodiments 1 or 2, wherein the first layer, the third layer, or combination thereof has an outer surface that has less than 50 surface cracks per 0.5 square inch and a maximum of 3 surface protrusions of 0.1 mm in height dimension per 100 square.

Embodiment 10

The composite or method of manufacturing the composite according to embodiments 1 or 2, wherein the composite has a dielectric strength of at least 1200 volts/mil for the composite having a total thickness of 10 mil.

Embodiment 11

The composite or method of manufacturing the composite according to embodiments 1 or 2, wherein the outer surface of the first layer and the outer surface of the third layer have a surface roughness Ra of 20 microinches or less.

Embodiment 12

The composite or method of manufacturing the composite according to embodiments 1 or 2, wherein the composite has a flex life cycle of at least 5000 cycles as measured by an MIT flex test.

Embodiment 13

The composite or method of manufacturing the composite according to embodiments 1 or 2, wherein the first fluoropolymer and the second fluoropolymer are non-melt processible.

Embodiment 14

The composite or method of manufacturing the composite according to embodiment 13, wherein the non-melt processible fluoropolymer includes polytetrafluoroethylene (PTFE), modified polytetrafluoroethylene (mPTFE), or a combination thereof.

Embodiment 15

The composite or method of manufacturing the composite according to embodiment 14, wherein the first fluoropolymer includes polytetrafluoroethylene (PTFE) or modified polytetrafluoroethylene (mPTFE).

Embodiment 16

The composite or method of manufacturing the composite according to embodiment 14, wherein the second fluoropolymer includes polytetrafluoroethylene (PTFE) or modified polytetrafluoroethylene (mPTFE).

Embodiment 17

The composite or method of manufacturing the composite according to embodiment 13, wherein the first fluoropolymer, the second fluoropolymer, or combination thereof further include a melt processible fluoropolymer at an amount of not greater than about 10 weight %, based on the total weight of the first fluoropolymer and the second fluoropolymer.

Embodiment 18

The composite or method of manufacturing the composite according to embodiments 1 or 2, wherein the first fluoropolymer, the second fluoropolymer, or combination thereof further includes a filler.

Embodiment 19

The composite or method of manufacturing the composite according to embodiment 18, wherein the filler includes fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or combination thereof.

Embodiment 20

The composite or method of manufacturing the composite according to embodiment 18, wherein the filler is present in an amount of about 1% by volume to about 40% by volume, such as about 2% by volume to about 35% by volume, such as about 3% by volume to about 30% by volume.

Embodiment 21

The composite or method of manufacturing the composite according to embodiments 1 or 2, wherein the reinforcing fabric of the second layer includes at least one yarn in a warp direction, in a weft direction, or combination thereof, the at least one yarn including a fluoropolymer fiber, an aramid fiber, a glass fiber, or combination thereof.

Embodiment 22

The composite or method of manufacturing the composite according to embodiment 21, wherein the at least one yarn includes the glass fiber.

Embodiment 23

The composite or method of manufacturing the composite according to embodiment 22, wherein the at least one yarn in the warp direction and the weft direction includes the glass fiber.

Embodiment 24

The composite or method of manufacturing the composite according to embodiment 21, wherein the fluoropolymer fiber includes polytetrafluoroethylene (PTFE) or modified polytetrafluoroethylene (mPTFE).

Embodiment 25

The composite or method of manufacturing the composite according to embodiment 21, wherein the reinforcing fabric is woven or non-woven.

Embodiment 26

The composite or method of manufacturing the composite according to embodiments 1 or 2, wherein the first layer and the second layer are directly in contact, the second layer and the third layer are directly in contact, or combination thereof.

Embodiment 27

The composite or method of manufacturing the composite according to embodiments 1 or 2, wherein the first layer, the third layer, or combination thereof have a thickness of about 0.05 mm to about 2.0 mm, such as about 0.1 mm to about 2.0 mm, or even about 0.2 mm to about 2.0 mm.

Embodiment 28

The composite or method of manufacturing the composite according to embodiments 1 or 2, wherein the reinforcing fabric has a thickness of about 0.04 mm to about 1.0 mm, such as about 0.08 mm to about 1.0 mm, or even about 0.20 mm to about 0.8 mm.

Embodiment 29

The composite or method of manufacturing the composite according to embodiments 1 or 2, wherein the reinforcing fabric has a weight about 100 g/m$^2$ to about 500 g/m$^2$, such as about 120 g/m$^2$ to about 480 g/m$^2$, or even about 200 g/m$^2$ to about 400 g/m$^2$.

Embodiment 30

The method of embodiment 2, wherein continuously compressing and heating the stack is at a pressure of at least 2 MPa and at a temperature of about 250° C. to about 380° C. for a first duration of at least 20 seconds.

Embodiment 31

The method according to embodiment 30, wherein the first duration is at least about 30 seconds.

Embodiment 32

The method according to embodiments 30-31, further including, after the heating, cooling the stack to a second temperature at a cooling rate of about 5° C./s to about 20° C./s.

Embodiment 33

The method according to embodiments 30-32, wherein the pressure is about 2 MPa to about 8 MPa.

Embodiment 34

The method according to embodiment 2, wherein the first layer and the third layer are cast, skived, or extruded.

Embodiment 35

The method according to embodiment 2, wherein the first layer and the third layer are dry powder coated.

Embodiment 36

The method according to embodiment 2, wherein the second layer includes a dry powder coating.

Embodiment 37

The method according to embodiment 36, wherein the dry powder coating includes a non-melt processible fluoropolymer.

Embodiment 38

The method according to embodiment 2, further including surface treating the reinforcing fabric prior the overlying of the third layer.

Embodiment 39

The composite according to embodiment 1, further including at least one midlayer directly in contact with a major surface of the reinforcing fabric.

Embodiment 40

The composite according to embodiment 39, wherein the midlayer includes tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), a copolymer, a blend, or combination thereof.

Embodiment 41

The composite according to embodiment 39, wherein the at least one midlayer has an adhesive strength at an interface between the midlayer and the reinforcing fabric.

Embodiment 42

An apparatus including a composite according to embodiment 1, wherein the apparatus is a processing aid for an electronic device, a food, a polymer, an industrial device, or a structural article.

Embodiment 43

The apparatus according to embodiment 42, wherein the processing aid is a release sheet, a belt, a tape, or a sheet.

Embodiment 44

An apparatus to manufacture an electronic device, the apparatus including: a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 3 surface protrusions of 0.1 mm in height dimension per 100 square meters and less than 50 surface cracks per 0.5 square inch as measured by a Cognex 5605 vision system; wherein the composite has a continuous length of at least about 3 meters.

Embodiment 45

An apparatus to process food, the apparatus including: a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch as measured by a Cognex 5605 vision system and a water vapor transmission rate of less than about 0.05 oz/m$^2$-day for the composite having a total thickness of 10 mil.

Embodiment 46

The apparatus of embodiment 45, wherein the composite has a flex life cycle of at least 5000 cycles as determined through MIT flex testing.

Embodiment 47

The apparatus of embodiment 45, wherein the composite has a surface smoothness Ra of 20 microinches or less.

Embodiment 48

An apparatus to process polymers, the apparatus including: a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch as measured by a Cognex 5605 vision system and a water vapor transmission rate of less than about 0.05 oz/m$^2$-day for the composite having a total thickness of 10 mil.

Embodiment 49

The apparatus of embodiment 48, wherein the composite has a flex life cycle of at least 5000 cycles as measured by an MIT flex test.

Embodiment 50

The apparatus of embodiment 48, wherein the composite has a surface smoothness Ra of 20 microinches or less.

Embodiment 51

An apparatus to insulate an electrical device, the apparatus including: a composite, the composite including a first layer of a first fluoropolymer; a second layer of at least one ply of a reinforcing fabric overlying the first layer; and a third layer of a second fluoropolymer overlying the second layer opposite to the first layer; wherein the composite has a dielectric strength of at least 1000 volts/mil for the composite having a total thickness of 10 mil.

Embodiment 52

An apparatus to process a heat sealable polymer, the apparatus including: a composite, the composite including a first layer of a first fluoropolymer; a second layer of at least one ply of a reinforcing fabric overlying the first layer; and a third layer of a second fluoropolymer overlying the second layer opposite to the first layer, wherein the first layer, the third layer, or combination thereof have an outer surface that has less than 50 surface cracks per 0.5 square inch as measured by a Cognex 5605 vision system and wherein the composite has a surface smoothness Ra value of less than 20 microinches.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

A composite material of a woven fiberglass fabric and PTFE fluoropolymer coating is produced through a dip coating process. The woven fiberglass fabric substrate is of style 128. The weight of the final composite is 16.5 oz/square yard (560 gram/square meter) and the final thickness is 0.010". A portion of this material, 110 yards in length, is processed in the manner described in embodiment 2, being subjected to a pressure of 4 MPa (40 bar) and a temperature of 536° F. (280° C.) in a continuous roll to roll process. Both the original composite (i.e. "control" and unprocessed via embodiment 2) and the processed material are evaluated for number of surface protrusions, surface roughness, and wear properties.

The number of surface protrusions is evaluated by visual and physical inspection of the material. The as-made unprocessed, control composite is found to have 1.5 surface protrusions of at least 0.1 mm in height per every 10 square meters. The processed material is found to have 0.4 surface protrusion of at least 0.1 mm in height per every 10 square meters. This is an approximately 70% reduction is surface protrusions between processed and unprocessed material.

The control material is measured with an average surface roughness of 15 Ra. The process material maintained a similar level of surface roughness with an average roughness of 16 Ra.

Figure 3:
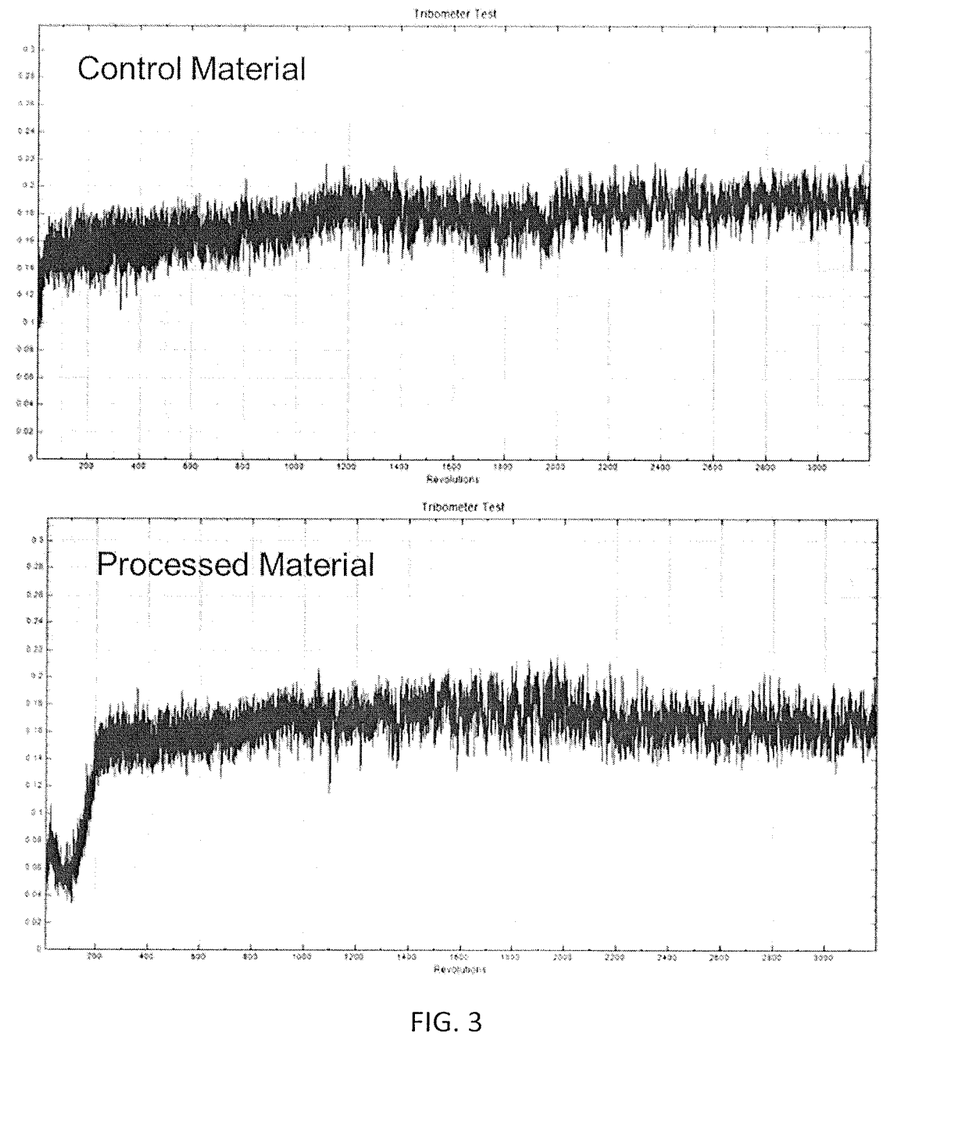
FIG. 3 is a graphical depiction of coefficient of friction as determined by pin-on disk wear test of an exemplary processed composite compared to an unprocessed control material.
Figure 4:
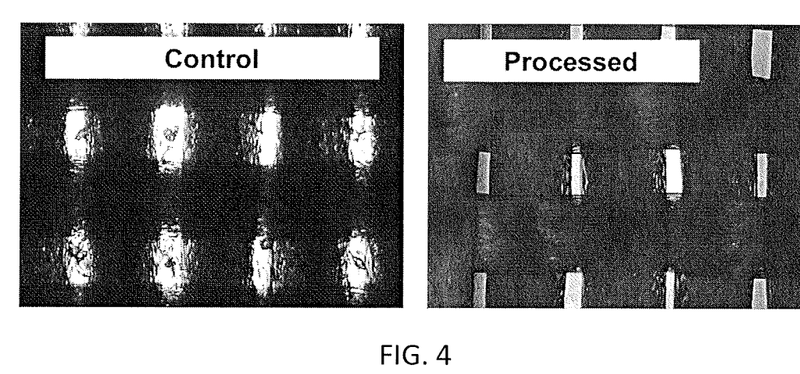
FIG. 4 includes optical microscopy images comparing an exemplary processed composite compared to an unprocessed control material.

The wear properties of the material are examined by way of ASTM G99-17; "Standard Test Method for Wear Testing with a Pin-on-Disk Apparatus. The difference in performance is best illustrated by comparing the plots of coefficient of friction for the two materials as shown in FIG. 3. The average coefficient of friction for the control material starts at about 0.1 and quickly increases to approximately 0.16 once the test begins while the processed sample maintains a coefficient of friction of approximately 0.06 for the first 200 revolutions of test. Accordingly, the coefficient of friction for the processed sample is virtually unchanged Another portion of the 10 mil coated fabric is processed according to embodiment 2 but is subjected to a pressure of 4 MPa (40 bar) and a temperature of 644° F. (340° C.) in a continuous roll to roll process. This material is evaluated for void content by use of optical microscopy and results are shown in FIG. 4. The dark areas in the images are the warp and fill yarns of the fabric while the lighter areas are comprised solely of PTFE. Within the lighter areas of the control material, voids can be seen as bubbled within the PTFE. The processed material however shows an almost complete elimination of optically visible voids within the composite.

This material is also evaluated for dielectric strength. The control sample is measured to have an average dielectric strength of 850.3 volts/mil while the processed material had an average dielectric strength of 1268 volts/mil. This equates to a 49% increase in dielectric strength.

Example 2

Figure 5:
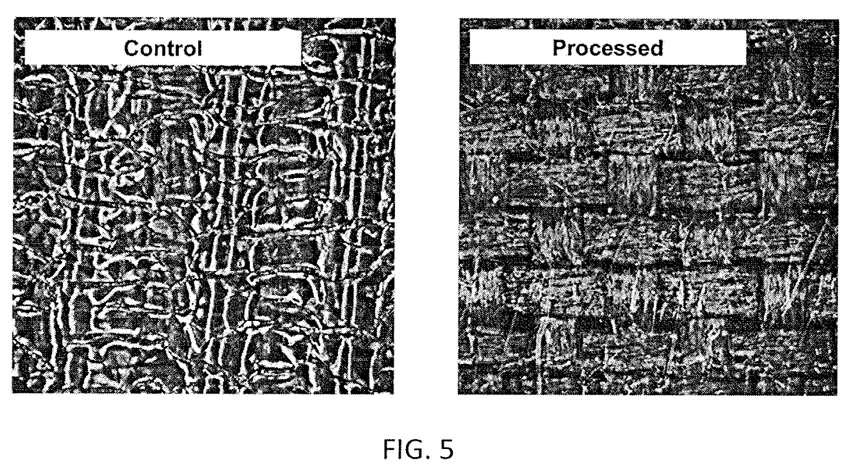
FIG. 5 includes optical microscopy images comparing an exemplary processed composite compared to an unprocessed control material.

Another example of a woven fiberglass fabric and PTFE fluoropolymer coating is also produced through a dip coating process. This process is slightly different than the first example resulting in a composite with a highly cracked surface. The woven fiberglass fabric substrate is of style 128. The weight of the final composite is 16.5 oz/square yard (560 gram/square meter) and the final thickness is 0.010". This material is processed as described in embodiment 2 using a pressure of 2.3 MPa (23 bar) and a temperature of 689° F. (365° C.). The degree of surface cracking is assessed by optical microscopy and a comparison between the control and processed sample is provided in FIG. 5. The process sample shows a greater than 90% reduction in surface cracking.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A composite comprising:
   a first layer of a first fluoropolymer;
   a second layer of at least one ply of a reinforcing fabric overlying the first layer;
   a third layer of a second fluoropolymer overlying the second layer opposite to the first layer to form a stack, wherein the stack is subjected to continuous heat of about 200° C. to about 400° C. and simultaneous pressure of about 0.5 MPa to about 6 MPa for at least 10 seconds to provide the composite, wherein the first layer, the third layer, or combination thereof has an outer surface that has less than 50 surface cracks per 0.5 square inch; and
   at least one midlayer, wherein the at least one midlayer is between the first layer and the second layer, between the second layer and the third layer, or combination thereof;
   wherein the composite has a continuous length of at least about 3 meters and wherein the composite has a total thickness of 0.3 mm to about 2.0 mm.

2. The composite according to claim 1, wherein the composite has an initial wear resistance quantified as a less than 10% change in coefficient of friction after being subject to 200 revolutions in a pin-on disk wear test.

3. The composite according to claim 1, wherein the composite has an abrasion resistance of less than 1% mass loss after 100 cycles or less than 1% exposure of fabric knuckles.

4. The composite according to claim 1, wherein the first layer, the third layer, or combination thereof has an outer surface that has less than 50 surface cracks per 0.5 square inch and a maximum of 3 surface protrusions of 0.1 mm in height dimension per 100 square meters.

5. The composite according to claim 1, wherein the outer surface of the first layer and the outer surface of the third layer have a surface roughness Ra of 20 microinches or less.

6. The composite according to claim 1, wherein the first fluoropolymer and the second fluoropolymer are non-melt processible.

7. The composite according to claim 6, wherein the non-melt processible fluoropolymer comprises polytetrafluoroethylene (PTFE), modified polytetrafluoroethylene (mPTFE), or a combination thereof.

8. The composite according to claim 6, wherein the first fluoropolymer, the second fluoropolymer, or combination thereof further comprise a melt processible fluoropolymer at an amount of not greater than about 10 weight %, based on the total weight of the first fluoropolymer and the second fluoropolymer.

9. The composite according to claim 1, wherein the first fluoropolymer, the second fluoropolymer, or combination thereof further comprises a filler.

10. The composite according to claim 1, wherein the reinforcing fabric of the second layer comprises at least one yarn in a warp direction, in a weft direction, or combination thereof, the at least one yarn comprising a fluoropolymer fiber, an aramid fiber, a glass fiber, or combination thereof.

11. The composite according to claim 10, wherein the reinforcing fabric is woven or non-woven.

12. The composite according to claim 1, wherein the at least one midlayer is directly in contact with a major surface of the reinforcing fabric.

13. The composite according to claim 12, wherein the midlayer comprises tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), a copolymer, a blend, or combination thereof.

14. A method of manufacturing a composite, the method comprising:
   providing a first layer of a first fluoropolymer;
   overlying a second layer of at least one ply of a reinforcing fabric onto the first layer;
   overlying a third layer of a second fluoropolymer onto the second layer opposite to the first layer to form a stack;
   providing at least one midlayer, wherein the at least one midlayer is between the first layer and the second layer, between the second layer and the third layer, or combination thereof; and continuously compressing at a pressure of about 0.5 MPa to about 64 MPa and heating the stack at a temperature of about 200° C. to about 400° C. through two substantially parallel surfaces for at least 10 seconds to form the composite at a continuous length of at least 3 meters and wherein the composite has a total thickness of 0.3 mm to about 2.0 mm.

15. The method according to claim 14, wherein the first layer and the third layer are cast, skived, or extruded.

16. The method according to claim 14, wherein the first layer and the third layer are dry powder coated.

17. The method according to claim 14, further comprising a dry powder coating on the second layer, wherein the dry powder coating comprises a non-melt processible fluoropolymer.

18. An apparatus including a composite according to claim 1, wherein the apparatus is a processing aid for an electronic device, a food, a polymer, an industrial device, or a structural article.

* * * * *

UNITED STATES PATENT AND TRADEMARK OFFICE
CERTIFICATE OF CORRECTION

PATENT NO.       : 11,034,129 B2
APPLICATION NO.  : 15/435152
DATED            : June 15, 2021
INVENTOR(S)      : Joseph G. Sargent et al.

It is certified that error appears in the above-identified patent and that said Letters Patent is hereby corrected as shown below:

In the Claims

Column 21, Line 2, please delete "64 MPa", and insert --6 MPa--

Signed and Sealed this
Twenty-third Day of May, 2023

Katherine Kelly Vidal
*Director of the United States Patent and Trademark Office*